United States Patent
Altevogt et al.

(10) Patent No.: US 10,902,348 B2
(45) Date of Patent: Jan. 26, 2021

(54) COMPUTERIZED BRANCH PREDICTIONS AND DECISIONS

(71) Applicant: International Business Machines Corporation, Armonk, NY (US)

(72) Inventors: Peter Altevogt, Ettlingen (DE); Andreea Anghel, Adliswil (CH); Gero Dittmann, Zurich (CH); Cedric Lichtenau, Stuttgart (DE); Thomas Pflueger, Leinfelden (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 923 days.

(21) Appl. No.: 15/599,770

(22) Filed: May 19, 2017

(65) Prior Publication Data
US 2018/0336491 A1  Nov. 22, 2018

(51) Int. Cl.
*G06N 20/20* (2019.01)
*G06F 9/38* (2018.01)
*G06N 20/00* (2019.01)
*G06F 9/30* (2018.01)
*G06N 5/00* (2006.01)

(52) U.S. Cl.
CPC .......... *G06N 20/00* (2019.01); *G06F 9/3005* (2013.01); *G06F 9/30043* (2013.01); *G06N 5/003* (2013.01); *G06N 20/20* (2019.01); *G06F 9/3842* (2013.01)

(58) Field of Classification Search
CPC .............................. G06F 9/3842; G06N 20/20
See application file for complete search history.

(56) References Cited

U.S. PATENT DOCUMENTS

| 6,779,108 | B2 | 8/2004 | Ju et al. |
| 7,571,302 | B1 | 8/2009 | Chen et al. |
| 9,477,469 | B2 | 10/2016 | Gschwind et al. |
| 9,507,598 | B1 * | 11/2016 | Bonanno ............. G06F 9/30058 |
| 2005/0278513 | A1 | 12/2005 | Aristodemou et al. |
| 2015/0331691 | A1 | 11/2015 | Levitan et al. |
| 2017/0090936 | A1 * | 3/2017 | Al Sheikh ............. G06F 9/3806 |

(Continued)

OTHER PUBLICATIONS

Altevogt et al., "Computerized Branch Predictions and Decisions," U.S. Appl. No. 15/802,776, filed Nov. 3, 2017.

(Continued)

*Primary Examiner* — Michael J Metzger
(74) *Attorney, Agent, or Firm* — Cantor Colburn LLP; Daniel Morris

(57) ABSTRACT

Embodiments of the invention include a computer-implemented method of processor branch prediction. This method aims at training a machine-learning model of processor branch behavior while a processing unit executes computer instructions. Such instructions include branch instructions, load instructions and store instructions. The load instructions and the store instructions cause a control unit of the processing unit to load data from a memory into processor registers and store data from the processor registers to the memory, respectively. Basically, the training of the model involves, for each of N branch instructions (N>2) encountered whilst the processing unit executes said branch instructions: identifying a next branch instruction; and feeding the machine-learning model with carefully chosen inputs.

2 Claims, 5 Drawing Sheets

(56) References Cited

U.S. PATENT DOCUMENTS

2018/0232235 A1* 8/2018 Gaur .................... G06F 9/3838
2018/0285107 A1* 10/2018 Sadasivam ............ G06F 9/3848

OTHER PUBLICATIONS

List of IBM Patents or Patent Applications Treated As Related; Date Filed: May 19, 2017, 2 pages.
B. Calder et al, "Evidence-based Static Branch Prediction using Machine Learning", ACM Transactions on Programming Languages and Systems (TOPLAS) 19.1, 1997, 43 pages.
J. E. Smith, "A Study of Branch Prediction Strategies," Proceedings of the 8th Annual Symposium on Computer Architecture, IEEE Computer Society Press, May 1981, pp. 135-148.
M. Evers, "Improving Branch Prediction by Understanding Branch Behavior", 2000, University of Michigan, PhD dissertation, 163 pages.
T. H. Heil et al., "Improving Branch Predictors by Correlating on Data Values," Proceedings of the 32nd Annual International Symposium on Microarchitecture, MICRO-32, 1999, 10 pages.

* cited by examiner

COMPUTERIZED BRANCH PREDICTIONS AND DECISIONS

BACKGROUND

The invention relates in general to the field of processor branch prediction and processor branch decision.

The accuracy of branch predictors in modern processors is a critical factor in the overall performance of a computer. There are two basic methods to access a branch prediction table with x-entries. A first method relies on local history. This approach typically uses a hash of the instruction address to log(x) bits. The second method makes use of the global history and builds an address vector with the last log(x)-branch decisions.

Both methods can be combined in a multitude of ways. All such methods consider previous branch decisions and the addresses of branch instructions as an input. While the data structures storing the history of branch decisions continue to grow, prediction accuracy has not improved significantly in the recent years.

SUMMARY

According to a first aspect, embodiments of the present invention include a computer-implemented method of processor branch prediction. This method aims at training a machine-learning model of processor branch behavior while a processing unit executes computer instructions. Such instructions include branch instructions, load instructions and store instructions. The load instructions and the store instructions cause a control unit of the processing unit to load data from a memory into processor registers and store data from the processor registers to the memory, respectively. Basically, the training of the model involves, for each of N branch instructions (N>2) encountered whilst the processing unit executes said branch instructions: identifying a next branch instruction; and feeding the machine-learning model with carefully chosen inputs. To start with, the model is fed with an address, in the memory, of the branch instruction identified. In addition, the model is fed with an outcome of the corresponding branch, i.e., whether the corresponding branch was taken or not by the processing unit while executing it. For completeness, the model is fed with load and/or store information, respectively pertaining to one or more past load instructions and/or store instructions executed by the processing unit. The model is trained so as to identify one or more patterns of branch decision, which can hence later be used for branch decision.

The present approach has shown significant improvements in branch-prediction accuracy. Namely, up to 92% accuracy can be reached thanks to embodiments as discussed herein. Such improvements arise from the fact that, in the present scheme, load and/or store information (i.e., information as to past load instructions and/or store instructions) is taken into account, in addition to addresses and outcomes of the branch instructions, at each iteration.

In embodiments, the training comprises, for each of the N branch instructions, feeding the machine-learning model with load information as to one or more past load instructions executed by the processing unit. Relying on loads (rather than store information alone) is more intuitive and therefore more promising. It has further been shown to yield significant improvements to the prediction accuracy.

The load information can include one or each of: one or more memory addresses, from which the one or more past load instructions were respectively instructing to load data from the memory into the processor registers; and data contents accordingly loaded from the memory by the control unit, due to said one or more past load instructions. Data contents and/or addresses represent load information that is relevant to the context in which branch decisions are made and, therefore, can advantageously be taught to the machine-leaning model, to improve the pattern recognition. Note, however, that considering load information solely related to data contents accessed yields better results than considering memory addresses accessed by loads. Considering both data contents and memory addresses accessed further improves the prediction accuracy, compared to data contents alone. Thus, in embodiments of the invention, the load information considered can include each of the memory addresses and the data contents accordingly loaded. In variants, the load information considered can include only the data contents or the memory addresses accessed by loads.

Said load information can pertain to a last load instruction executed by the processing unit prior to executing said next branch instruction identified, assuming this information is available in time. Yet, as the time between the availability of the load information and the branch may be too short for the latency of the branch predictor, one may, in variants, consider a penultimate load instruction (at least where the last load instructions are not available in time). In other variants, one may consider each of the last load instruction and a penultimate load instruction as executed by the processing unit prior to executing the next branch instruction identified. In still other variants, one may consider the memory address that the load accesses as this address is available earlier. This also provided a significant improvement.

The training of the model is performed thanks to a cognitive algorithm. The latter may notably be a logistic regression algorithm, a decision trees algorithm or random forests algorithm. Yet, among all the machine-learning algorithms explored by the Inventors, the best performing algorithm was the random forests.

In embodiments, the random forests algorithm is fed (for each of the N branch instructions) with load information as to one or more past load instructions executed by the processing unit. Yet, the largest improvements were obtained by considering the last loaded data. Where the last loaded data are not available in time, the memory address that the load accesses can be used as a substitute (as it is available earlier than the data contents accessed, as explained above). In both cases, we note that the random forest algorithm can be fed with load information as to a last load instruction only, as executed by the processing unit prior to executing said next branch instruction identified. In variants, though, penultimate data contents/memory addresses can be used too, as noted earlier.

In general, the number N of branch instructions considered to train the model is greater than 200, less than 4000, and can be between 500 and 2000, e.g., of 1000. Feeding the model with load information (in addition to addresses and outcomes of the branch instructions) makes it possible to restrain the sizes of data structures storing the history of branch decisions, trading off one type of input data against the other.

According to a complementary aspect, the invention is embodied as a computer-implemented method of processor branch decision. The decision method relies on a model trained as described above and therefore can be considered as englobing the training phase. In this method, a machine-learning model is trained while a previously trained model is used by the processing unit for executing computer instructions according to patterns of branch decision identified while training the previously trained model.

In practice, a previously trained model may for instance be substituted with a model currently being trained, upon completion of execution of N branches by the processing unit. The substituted model can then be used by the processing unit for executing computer instructions according to patterns of branch decision identified therefrom.

The training of a further machine-learning model can start upon substituting the previously trained model. The previously trained model and the model that is currently being trained can be based at least in part on a same cognitive algorithm, e.g., a random forests algorithm.

Optionally, the model that is currently trained is additionally fed with decision branch history aggregated while training a previously trained machine-learning model.

According to another aspect, the invention is embodied as a processor branch prediction module. This module can include a training unit configured to train a machine-learning model of processor branch behavior while a processing unit executes computer instructions that include branch instructions, load instructions and store instructions, as explained above. The training unit is further configured to identify branch instructions and feed the machine-learning model with addresses thereof, outcomes of the branches, and load and/or store information, consistently with the present branch prediction methods.

According to a further aspect, the invention is embodied as a computerized system, comprising a processing unit (with a control unit) and a memory storing a processor branch prediction module as described above.

According to a final aspect, the invention is embodied as a computer program product for processor branch prediction. This program product can include a computer readable storage medium having program instructions embodied therewith. The program instructions are executable by a computerized system to cause the latter to train a machine-learning model of processor branch behavior, according to the same principles as used in the present methods of processor branch prediction.

Computerized methods, modules, systems and computer program products embodying the present invention will now be described, by way of non-limiting examples, and in reference to the accompanying drawings.

BRIEF DESCRIPTION OF THE DRAWINGS

The accompanying drawings show simplified representations of devices or parts thereof, as involved in embodiments. Similar or functionally similar elements in the figures have been allocated the same numeral references, unless otherwise indicated.

DETAILED DESCRIPTION

Figure 1:
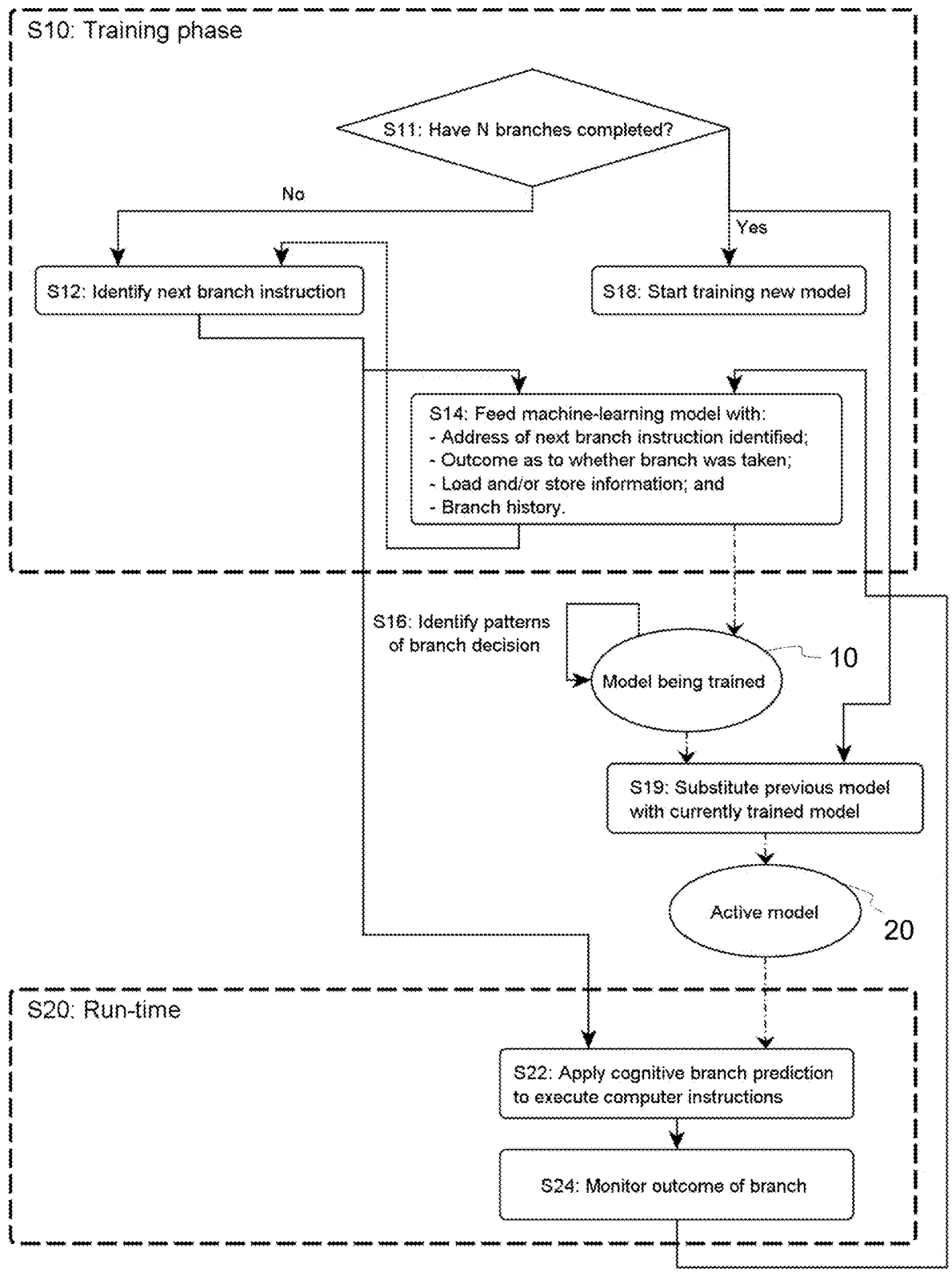
FIG. 1 is a flowchart illustrating high-level operations of a method of processor branch prediction and branch decision, according to embodiments.
Figure 2:
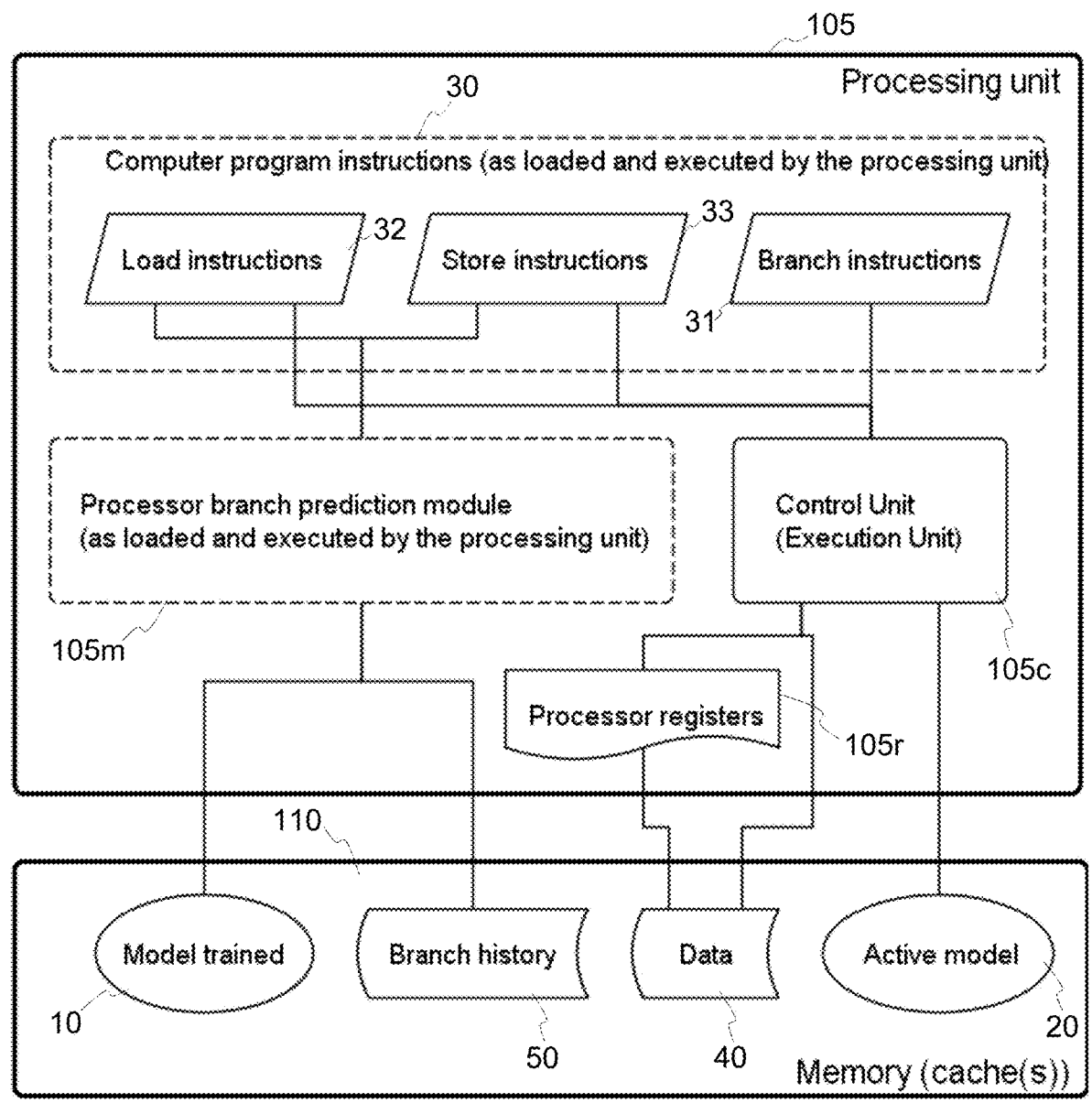
FIG. 2 schematically represents components involved in the method of FIG. 1, including a memory (and/or memory caches) and a processing unit, as well as components thereof.

In reference to FIGS. 1 and 2, an aspect of the invention is now described, which concerns a computer-implemented method of processor branch prediction.

Essentially, this method consists in training S10 a machine-learning model 10 of processor branch behavior while a processing unit 105 executes computer instructions 30. Instructions 30 may notably include branch instructions 31, load instructions 32 and store instructions 33.

The load instructions 32 and the store instructions 33 both cause a control unit 105c of the processing unit 105 to interact with a memory 110, e.g., via one or more memory caches thereof. A "control unit" as referred to herein is also commonly called an "execution unit".

The load instructions 32 causes the control unit 105c of the processing unit 105 to load (i.e., fetch) data from the memory 110 into processor registers 105r of the processing unit 105. On the contrary, the store instructions 33 cause the control unit 105c to store data from the processor registers 105r to the memory 110.

The processor registers are sometimes referred to as "memory data registers". Furthermore, a "memory" as used herein typically includes a main memory and/or a cache memory, which may include one or more levels of cache. In typical implementations, the control unit accesses the main memory only indirectly through the cache hierarchy (unless the processor has no cache, which is unlikely). Still, because a cache is also a type of memory, embodiments described below simply refer to a "memory", for simplicity.

The training S10 of the model 10 is performed while the processing unit 105 executes branch instructions, so as for the model to learn in "real-time". This training relies on a two-operation process, iterated for each of N branch instructions 31 encountered while the processing unit 105 executes the branch instructions 31. At each iteration, a next branch instruction is identified (operation S12, FIG. 1). Then, the machine-learning model 10 is fed (operation S14) with an address, in the memory 110, of the branch instruction identified at operation S12, and an outcome branch, i.e., the outcome of whether the corresponding branch was taken or not by the processing unit 105 while executing it.

Remarkably, load and/or store information are additionally fed into the model, at each iteration. Such information respectively pertains to one or more past load instructions 32 and/or store instructions 33, as executed by the processing unit 105. Examples of such load and/or store information that may be taken into consideration are discussed later in detail.

Such operations S12, S14 are performed so as for the underlying cognitive algorithm of the machine-learning model to be able to identify S16 one or more patterns of branch decision. That is, a cognitive algorithm (e.g., random forests) is used for pattern recognition, as discussed later in detail.

The present approach has shown significant improvements in branch-prediction accuracy, as discussed later in reference to FIG. 4. Namely, up to 92% accuracy can be reached thanks to embodiments as discussed herein. Such improvements arise from the fact that, in the present scheme, load and/or store information (i.e., information as to past load instructions and/or store instructions) is taken into account, in addition to addresses and outcomes of the branches.

In the literature, the terms "cognitive algorithm", "cognitive model", "machine-learning model" or the like are interchangeably used. This description makes no exception. However, in an effort to clarify terminologies, one may tentatively adopt the following definitions: a "machine-learning model" is generated by a "cognitive algorithm", which learns from several types of inputs (here branch addresses and outcomes, as well as load/store information); and a further distinction can be made between the model being trained and the model that eventually results (called "trained model") upon completion of the training.

Figure 4:
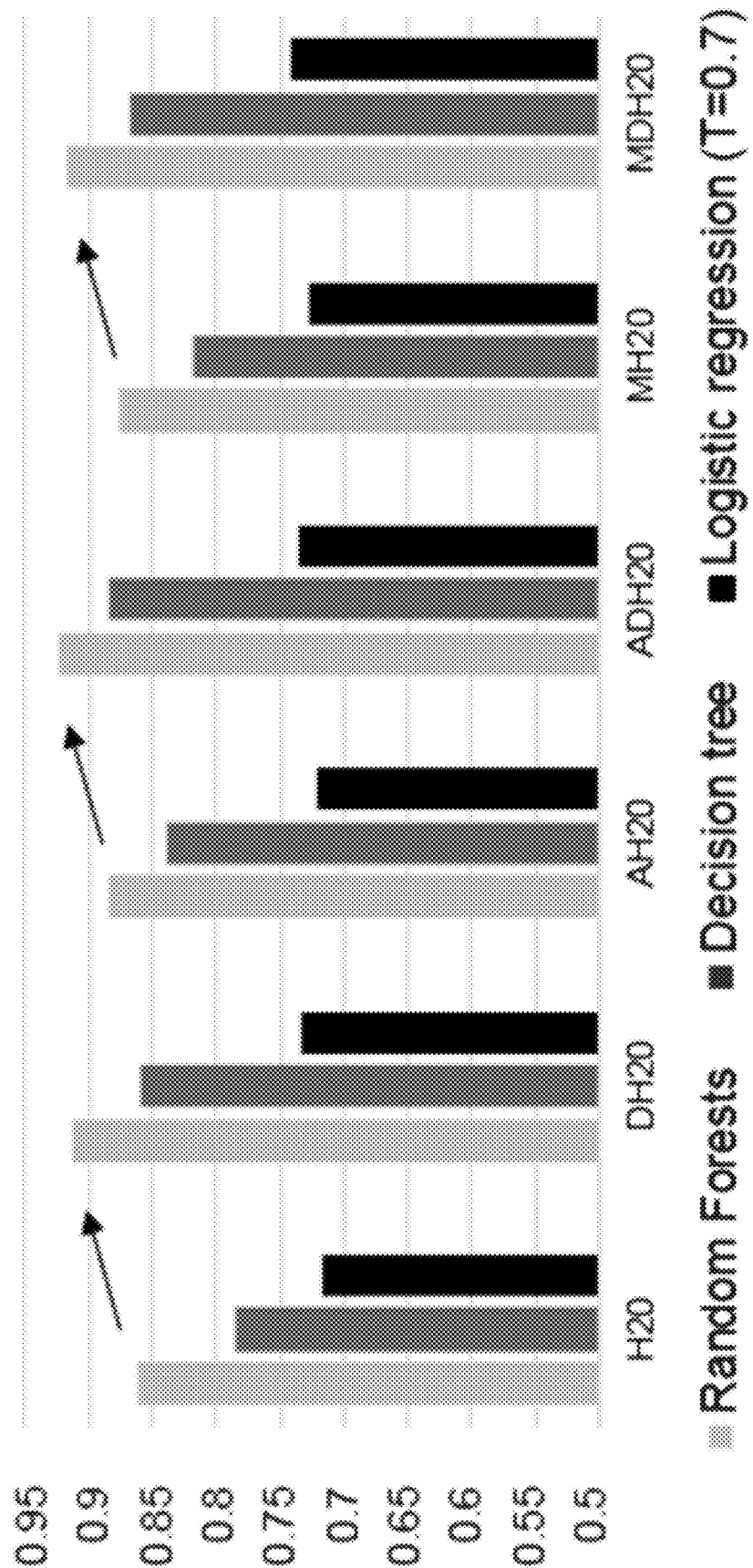
FIG. 4 is a bar chart comparing performances of different machine-learning algorithms, as used in embodiments.

For example, FIG. 4 compares the performances of various models, which rely on different types of inputs (e.g., data contents loaded and/or memory addresses of the loads), although they may use a same algorithm (e.g., a random forests).

In the present context, a machine-learning model is fed with new inputs for each new branch instruction identified at operation S12. Thus, the model 10 is progressively fed S14 with a branch history that enriches along the process. If necessary yet, additional branch history may be fed to the model, e.g., including branch history 50 aggregated while training previous models, which may prove advantageous in some cases. Still, the present algorithms are sufficiently performant, such that considering additional branch history should normally not be needed, especially if the number N of successive branches considered is suitably chosen.

In that respect, while the number N of successive branches considered need, strictly speaking, be greater than 2, it will typically be of several hundreds or thousands in practice. Still, relying on load and/or store information as additional inputs to the model allows reasonably large numbers N of branches to be considered. In typical implementations, this number N can be greater than 200, less than 4000, or between 500 and 2000, e.g., of 1000. Such values of N have found to be sufficient to train reliable models in practice, while still ensuring a reasonable size for the resulting history data structures. Also, this number may be dynamically updated, such that N may vary throughout the process, as discussed later in detail.

In general, load and/or store information may be considered to train S10 the model 10. Thus, embodiments can be contemplated that rely on load information only, on store information only, or on both. However, in embodiments, the model 10 is fed with inputs that contain load information, i.e., information as to one or more past load instructions 32 executed by the processing unit 105, at each iteration (for each branch instruction encountered). In such embodiments, the load information can be complemented by store information, or not. Considering load information has proved to yield significant improvements to the prediction accuracy.

The model 10 can be fed with load information only, in addition to addresses and outcomes of branches. That is, no store information is required. Relying on loads is more intuitive and therefore is more promising. Note that actual branch decisions are usually based on comparing two values. Typically, the source of at least one of those values is indirectly based on a load from memory. E.g., the values are the results of computations, some of whose inputs will often be loaded from memory). So, what is proposed here is to consider such loads for branch prediction purposes. For example, the last load or the second-to-last load before branching may be considered.

As noted in the summary section, the load information considered may for example comprise one or more past memory addresses, i.e., addresses from which the one or more past load instructions 32 were respectively instructing the processing unit to load data from the memory 110 into the processor registers 105r. Such addresses should not be confused with addresses of the load instructions themselves. Instead, these are the addresses from which the load instructions fetch data.

The load information considered may further comprise data contents 40 loaded from the memory 110 by the control unit 105c, i.e., data loaded due to said one or more past load instructions 32.

Such load information (data contents/addresses of the loads) is relevant to the context in which branch decision is made and, therefore, can advantageously be taught to the machine-leaning model 10, for pattern recognition purposes.

Note that the above addresses and the data contents 40 may be fed to the model 10 alone or, better, in combination. I.e., the load information considered may comprise each of said memory addresses and the data contents 40 accordingly loaded.

The load information considered can pertain to a last load instruction 32, as executed by the processing unit 105 prior to executing said the branch instruction identified at operation S12. Best results (in terms of prediction accuracy) were obtained when the load information considered includes information as to the very last load instruction. In particular, results improve when considering the very last load rather than the penultimate load alone (without the very last load). However, considering a previous load in addition to the very last one may further improve the prediction accuracy, eventually.

Now, as the time between the availability of the load information and the branch may be too short for the latency of the branch predictor, one may, in variants, consider to feed the algorithm with previous load information (at least when the last load information is not available in time). In other variants, one may consider the memory address that the load accesses as this address is available earlier than the data contents loaded, which also provided a significant improvement in the prediction accuracy. Higher accuracy will ultimately result in higher overall execution speed as fewer mispredicted instructions will be executed and discarded.

Various cognitive algorithms can be contemplated. Using such algorithms allows a model to be trained by feeding the cognitive algorithm with selected input information. The result of this training is a trained model, which can later be used to predict future outcomes of branch decision.

For instance, the model 10 may be trained S10 thanks to a logistic regression algorithm, a decision trees algorithm or a random forests algorithm. The latter was shown to provide best results in practice, especially when fed S14 with load information as to one or more past load instructions 32, and more particularly when this information includes information as to the very last load instruction (e.g., the last loaded data contents).

Thus, an embodiment of the invention for branch prediction is one that relies on a random forests algorithm, which, in addition to previous branch decisions, uses as input one or each of: the last data that a load instruction fetches from memory (if available); and a last memory address that this load instruction accesses.

Next, and complementary to branch prediction, another aspect of the invention concerns computer-implemented methods of processor branch decision. The present decision methods rely on a model trained as described above and therefore can be considered as englobing the training operation S10.

In the present decision methods, a machine-learning model 10 is trained S10 while a previously trained model 20 is used S20 by the processing unit 105 for executing S22 computer instructions 30 and, this, according to patterns of branch decision identified S16 thanks to the previously trained model 20.

A previously trained model may for instance be substituted S19 with a model that is currently being trained 10, upon S11 completion of execution of N branches by the processing unit 105. Thus, the substituted model becomes the active model 20, which can be used S22 by the processing unit 105 for executing S22 computer instructions 30 according to patterns of branch decision identified at operation S16 and, this, while training a new model based on decisions being made.

Figure 3:
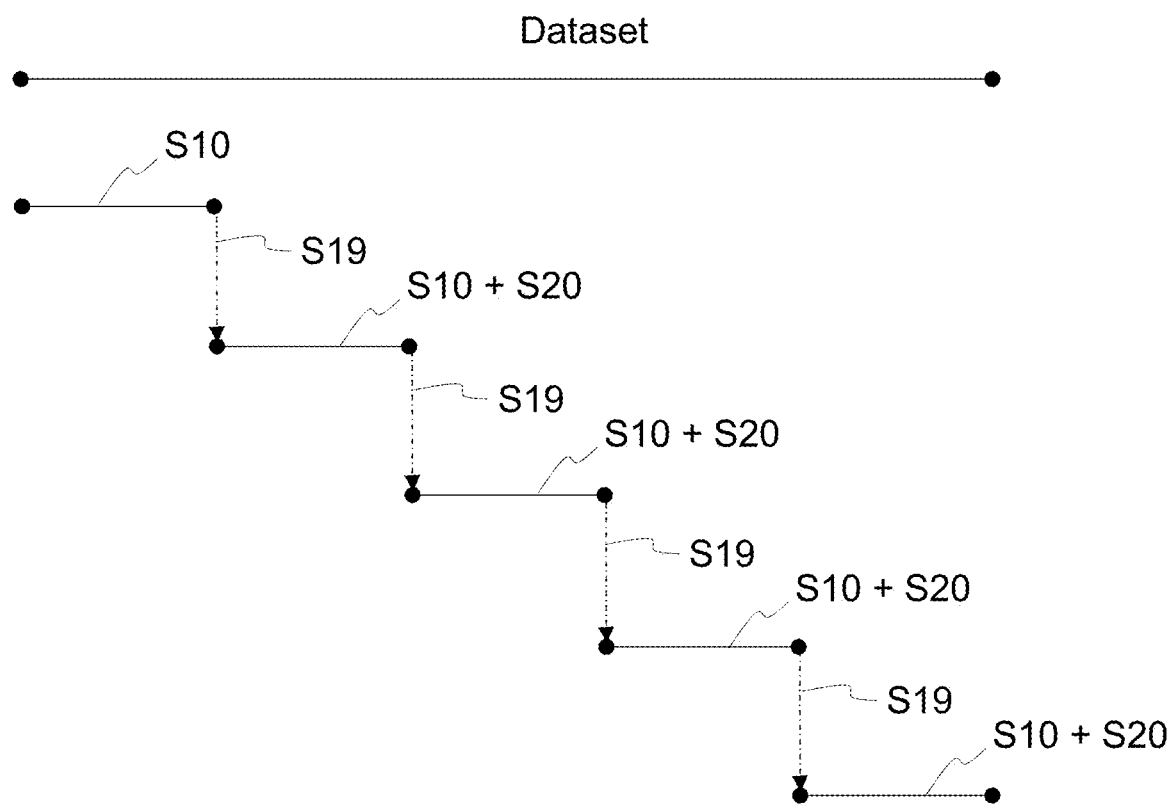
FIG. 3 is a flowchart illustrating an iterative algorithm, wherein, at each iteration but the very first one, a previously trained model is used for prediction, while this model is re-trained based on outcomes of the branches observed during this iteration, as involved in embodiments.

As illustrated in FIG. 3, a new machine-learning model 10 can start S18 being trained S10 upon substituting S19 the previously trained model 20. This way, an iterative process is obtained, wherein at each iteration but the very first one (where a model is trained for the first time), a previously trained model is used for prediction of branch decisions S20, while the underlying cognitive algorithm is being re-trained S10 based on outcomes of the branches observed during this iteration. In that respect, we note that the models as trained at each iteration can be based on a same cognitive algorithm. Yet, because this algorithm is fed with distinct inputs at each iteration, it yields a different model at the end of each iteration.

Note that iterations involved in FIG. 3 should not be confused with iterations involved at operations S12-S14 (FIG. 1), which are nested in the iterations shown in FIG. 3.

As noted earlier, the number N of branch instructions considered may be dynamically updated, based on a monitored S24 branch prediction accuracy. E.g., if the branch prediction accuracy of a previously trained model (currently active) happens to exceed a given threshold, then it may be decided to decrease the number N of branch instructions to be considered for a future model. Thus, the number N may vary from an iteration to the other, contrary to what FIG. 3 may suggest. When, for a given model currently being trained S10, it is determined S11 that a number N (as set for the current session) of branches were completed, then the currently active model 20 can be substituted with the newly trained model 10, and a new training session will start, which may use a different value of N.

As also noted earlier, in addition to load/store information and addresses and outcomes of the branch instructions, the model 10 under training S10 may additionally be fed S14 with additional decision branch history, as aggregated while training S10 a previous model. The current branch history can otherwise be regarded as incorporated in the model, because addresses and outcomes of the branch instructions are progressively fed at each iteration S14.

Performances achieved by various models, relying on various cognitive algorithms, are compared in FIG. 4. Namely, a logistic regression algorithm (LRA), a decision trees algorithm (DTA) and a random forests algorithm (RFA) were considered. Several experiments have been made, corresponding to different types of inputs fed into these algorithms, as denoted by the various keywords H20, DH20, AH20, ADH20, MH20, and MDH20 in FIG. 4. Namely:"Hxx" refers to the history of last xx branch outcomes; "A" indicates whether addresses of branches are considered, at each iteration; "D" indicates whether data contents loaded from memory were taken into consideration, at each iteration; and "M" refers to memory addresses accessed by loads, at each iteration.

The vertical axis (rotated in FIG. 4) measures the prediction accuracy obtained for the model used, in the various experiments made, whereas the X axis corresponds to the type of model used. Each model is constituted by: (i) a type of algorithm (RFA, LRA, DTA); and (ii) types of inputs (H20, DH20, MH20, etc.) it uses. Thus, each vertical bar refers to a distinct model.

The H20 models only learn from the last 20 outcomes of the branches. In addition to the last 20 outcomes of the branches, the DH20 models learn from the values (data contents) loaded from memory, that is, load information. Nearly a 6% increase in accuracy results from considering values (data) loaded from memory, when using the RFA. An even better increase in accuracy occurs when using the DTA, while the improvement is more modest in case of the LRA. Best results are obtained with the RFA.

The AH20 models learn from the last 20 outcomes of the branches and the branch addresses only, showing some improvement over the H20 models. Considering the values (data) loaded from memory as additional inputs fed to the model (ADH20) results in further improvement. Best results are again obtained with the RFA here.

Finally, the MH20 models learn from the last 20 outcomes of the branches and the memory addresses accessed by the load instructions (i.e., another type of load information than data contents). However, branch addresses and data contents were not considered in the MH20 models, contrary to the AH20/DH20/ADH20 models. While the MH20 models show some improvement over the H20 models, the MDH20 models show that substantial improvement can be obtained over the MH20 by further feeding data loaded from memory to the model. When using the LRA as a cognitive algorithm, best results are obtained with a MDH20 model. Else, when using the RFA or the DTA as cognitive algorithms, ADH20 models provide the best accuracy.

Overall, one measures the advantages gained by including load information in the cognitive algorithm. In addition, a residual gain of accuracy is obtained by considering branch addresses. Similarly, some improvement can be obtained when using store information (not reported here for the sake of brevity).

Referring now to FIG. 2, and according to another aspect, the invention can further be embodied as a processor branch prediction module 105m. The latter may basically consist in a training unit, which, when loaded in memory and executed by the processing unit 105 (as assumed in FIG. 2), is configured to train a machine-learning model 10 of processor branch behavior, according to principle described above in reference to FIG. 1.

As illustrated in FIG. 2, the branch prediction module 105m interacts, upon execution thereof, with computer instructions 30, so as to feed S14 the model 10 currently trained with addresses and outcomes of the branch instructions identified at operation S12, as well as load and/or store information pertaining to load instructions 32 and/or store instructions 33. Note that, although not depicted in FIG. 2 the module 105m may do so by soliciting the control (execution) unit 105c and/or the processor registers 105r. Moreover, in a typical hardware implementation, the models 10, 20 and the branch history 50 would typically not be stored in a main memory hierarchy but, rather, these would be stored in separate, small memories within (or closer to) the processor 105, for low-latency access. Again, the concept of "memory" (including that of FIG. 2) should here be understood in a broad sense. In addition, the control (execution) unit 105c is typically plural as different instruction types are typically executed by different units, including, e.g., a load/store unit, a floating-point unit, etc. Thus, one should keep in mind that FIG. 2 is just an abstract representation of various concepts as involved in embodiments of the invention.

Figure 5:
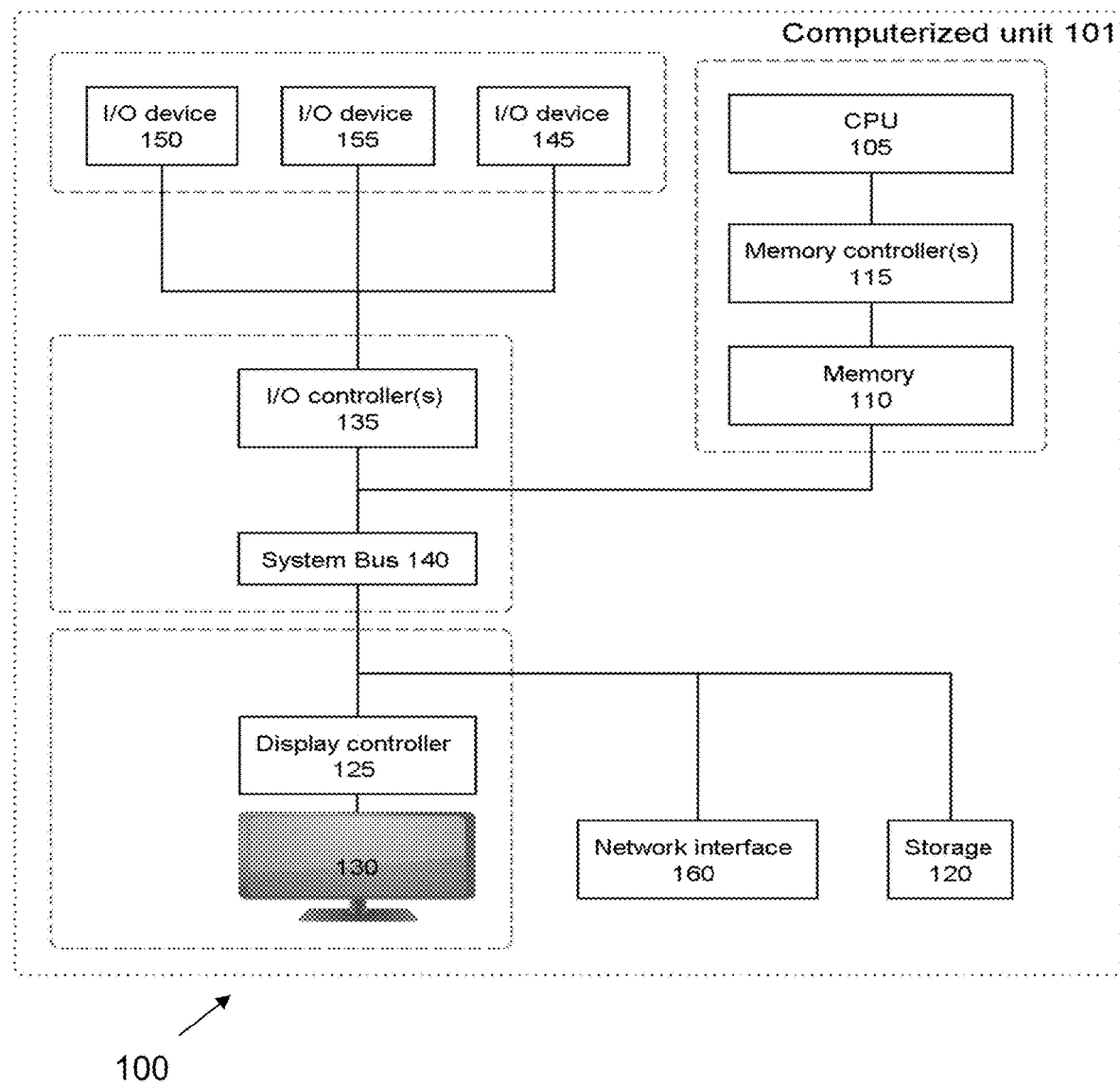
FIG. 5 schematically represents a general purpose computerized system, suited for implementing one or more method operations as involved in embodiments of the invention.

Referring now to FIG. 5, the invention may further be embodied as a computerized system, the latter comprising the memory 110 and the processing unit 105 (including said control unit 105c), with the processor branch prediction module loaded and executable by the processing unit 105. Additional aspects of this system are discussed below.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 100 depicted in FIG. 5 schematically represents a computerized unit 101, e.g., a general-purpose computer. In exemplary embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor may notably executes a module 105m, as well as computer instructions 30, amongst (many) other things, as assumed in FIG. 2. The processor 105 notably includes a control unit (or execution unit) 105c and can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which can include an ordered listing of executable instructions for implementing logical functions. In the example of FIG. 5, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network.

The network transmits and receives data between the unit 101 and external systems, if needed. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

For completeness, the invention can further be embodied as a computer program product for processor branch prediction (and decision). This program product can include a computer readable storage medium having program instructions embodied therewith, wherein the program instructions are executable by a computerized system such as depicted in FIG. 5, to cause the latter to take operations according to the present methods.

Thus, the present invention may be a system, a module, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computerized system, comprising:
    a processing unit, the latter including a control unit; and
    a memory, the latter storing a processor branch prediction module,
    wherein the processor branch prediction module comprises:
        a training unit configured, upon execution by said processing unit, to train a machine-learning model of processor branch behavior while the processing unit executes computer instructions that include branch instructions, load instructions and store instructions, the load instructions and the store instructions being so as to cause the control unit to load data from a memory into processor registers and store data from the processor registers to the memory, respectively, wherein
        the training unit is configured to, while training the machine-learning model and for each of N branch instructions, N>2, encountered whilst the processing unit executes said branch instructions:
            identify a next branch instruction; and
            feed the machine-learning model with:
                an address, in the memory, of the next branch instruction identified;
                an outcome as to whether a corresponding branch was taken or not by the processing unit while executing it; and
                load information as to one or more past load instructions executed by the processing unit, said load information comprises one or each of:
                    one or more memory addresses, from which the one or more past load instructions were respec-
tively instructing to load data from the memory into the processor registers;
                    data contents accordingly loaded from the memory by the control unit, due to said one or more past load instructions,
                    the one or more memory addresses; and
                    the data contents accordingly loaded from the memory by the control unit due to said one or more past load instructions.

2. A computer program product for processor branch prediction, the computer program product comprising a computer readable storage medium having program instructions embodied therewith, the program instructions being executable by a computerized system to cause the latter to:
    train a machine-learning model of processor branch behavior while a processing unit executes computer instructions that include branch instructions, load instructions and store instructions, wherein the load instructions and store instructions cause a control unit of the processing unit to load data from a memory into processor registers and store data from the processor registers to the memory, respectively,
    and wherein
    the program instructions further cause, upon execution, the computerized system to, while training the model, and for each of N branch instructions, N>2, encountered whilst the processing unit executes said branch instructions:
        identify a next branch instruction; and
        feed the machine-learning model with:
            an address, in the memory, of the next branch instruction identified;
            an outcome as to whether a corresponding branch was taken or not by the processing unit while executing it; and
            load information as to one or more past load instructions executed by the processing unit, said load information comprises one or each of:
                one or more memory addresses, from which the one or more past load instructions were respectively instructing to load data from the memory into the processor registers;
                data contents accordingly loaded from the memory by the control unit, due to said one or more past load instructions,
                the one or more memory addresses; and
                the data contents accordingly loaded from the memory by the control unit due to said one or more past load instructions.

* * * * *